May 27, 1952  R. O. BILL  2,598,031
ELEVATING MEANS FOR VEHICLE BEDS
Filed Nov. 19, 1949
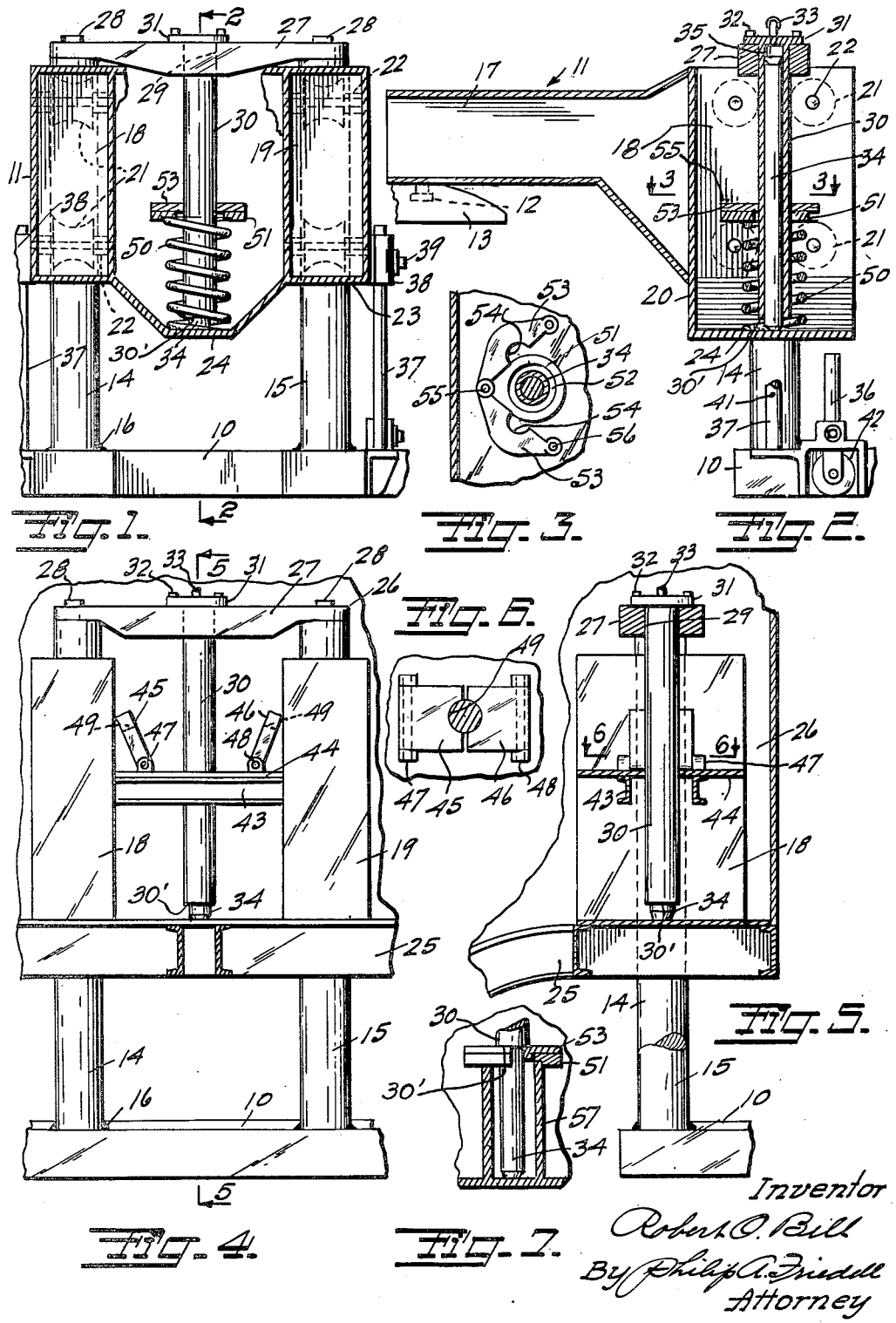
Inventor
Robert O. Bill
By Philip A. Friedell
Attorney Patented May 27, 1952

2,598,031

UNITED STATES PATENT OFFICE 2,598,031

ELEVATING MEANS FOR VEHICLE BEDS

Robert O. Bill, San Leandro, Calif.

Application November 19, 1949, Serial No. 128,404

4 Claims. (Cl. 280—44)

This invention relates to improvements in trucks and trailers with hydraulic bed elevating and lowering means and provides means for transferring the load from the hydraulic means to the supporting means for the bed, either through springs for spring loading, or through blocking elements for dead loading, and provides a new combination of elements which permits the front end of the trailer or truck bed to be elevated and lowered at will, and permits transfer of the load from the hydraulic means for direct support by the supporting means at will.

This invention is an improvement on my copending applications; Serial Numbers 63,694, now Patent 2,560,715 and 63,695, now Patent 2,546,491, both filed Dec. 6, 1948, covering vehicle bed elevating and lowering means; in that the load can be transferred at will between the elevating and lowering means and the positive support means.

As will be readily understood, there is always a possibility that any hydraulic elevating and lowering means may develop a leak, even in transit, and which would allow the bed to gradually settle, probably resulting in damage or wreckage, for which reason it is desirable that any such occurrence be guarded against, and for this reason the present invention is developed to provide a positive support for the load while in transit, while completely freeing the hydraulic means from the load.

With this invention, when the vehicle arrives at its destination, the body can be lowered so that the bed rests directly on the roadway, platform, or ground, and when loaded or unloaded, the body can again be raised to normal travel position and the load transferred from the raising and lowering means to the tractive front end of the vehicle, thus eliminating any possibility of the body settling in transit.

This invention also provides a new method of applying the power for elevating and lowering the bed, making it possible to remove and replace the hydraulic elevating and lowering means without disturbing the vehicle in any other manner, thus making repairs and replacements easy, rapid and convenient.

The objects and advantages of the invention are as follows:

First, to provide a vehicle with convertible hydraulic and positive supporting means.

Second, to provide a vehicle bed with hydraulic elevating and lowering means which is quickly and easily removable and replaceable without otherwise disturbing the vehicle.

Third, to provide a vehicle with hydraulic elevating and lowering means for the bed and with positive support means, with means operable for transferring the load between the elevating and lowering means and the positive support means at will.

Fourth, to provide means as outlined which is of the utmost simplicity in construction, operation and arrangement, easily removed, repaired and replaced, and which is economical to manufacture.

In describing the invention reference will be had to the accompanying drawings, in which:

Fig. 1 is a front elevation of the invention as applied to the gooseneck of a semi-trailer.

Fig. 2 is a sectional side elevation taken on a line 2—2 of Fig. 1.

Fig. 3 is a fragmentary section taken on line 3—3 of Fig. 2, showing the split-washer type spring seat.

Fig. 4 is a modification showing the invention applied to a truck tractor chassis.

Fig. 5 is a section taken on line 5—5 of Fig. 4.

Fig. 6 is a fragmentary view showing the positive supports to support the bed in elevated position and corresponds to a section taken on line 6—6 of Fig. 5, but modified to show the supports in closed or load supporting position.

Fig. 7 shows a modification for dead loading.

The invention can be applied to any type of semi-trailer, with body or with platform bed, as also to any type of truck with similar body or platform bed, and as illustrated in Figs. 1 and 2 includes a bed 10 having at its forward end a gooseneck 11 having suitable coupling means 12 for coupling the gooseneck to a tractor swivel seat 13.

A pair of vertical guides 14 and 15 are rigidly fixed to the forward end of the bed as indicated at 16 such as by welding or other suitable means to form a rigid structure in conjunction with the bed.

The gooseneck 11 consists of a frame 17 which is divided at its rearward end with a housing formed on each side as indicated at 18 and 19 and each being connected together at their forward ends by the header plate 20.

Guide rollers 21 are pivotally supported in each of these housings and are formed peripherally to the shape of the guides and cooperate with the respective front and back of each guide at the respective upper and lower ends of the housings as indicated, the rollers being supported in suitable bearings as indicated at 22.

The elements so far described are fully disclosed in the copending applications previously referred to.

The invention consists of providing a cross member across the lower ends of the guide housings, and which, as illustrated in Figs. 1 and 2 consists of the bottom plate 23 of the housings extending across between the housings and formed with a drop section 24 to form a support, or, as illustrated in Figs. 4 and 5, of comprising the chassis 25 of the tractor end of the truck and located in the rear portion of the truck cab 26, the guide housings being fixedly mounted thereon as shown.

A crosshead 27 spans the guides 14 and 15 and is secured at its opposite ends to the tops of the guides as indicated at 28, and this crosshead has a central passage 29 formed therethrough parallel to the axes of the guides.

The hydraulic jack includes a cylinder 30 which is slidable through the passage 29 in the crosshead and has a head 31 by which it is secured to the top of the crosshead as indicated at 32 and is provided with a fluid connection 33 for fluid under pressure. A plunger 34 is provided with sealing means such as a cup leather 35 at its upper end, with its lower end cooperating with the cross member 24 or tractor frame 25. As will be noted, with a semi-trailer, the support for the guide housings is the tractor swivel seat, while for the truck, the support is the rear end of the tractor frame. However, for the semi-trailer it is necessary to provide a temporary support for the guide housings when the gooseneck is uncoupled from the tractor, and this may consist of any suitable means such as the conventional jacks indicated at 36 for supporting the bed or any suitable means whereby the guide housings can be supported in the same position occupied at the time of uncoupling from the tractor, with the bed supportable in either elevated or lowered position independently of the guide housings, and is shown as consisting of a bar 37 which operates in a bearing 38 mounted on the side of the housing, with the lower end of the bar supported by the bed. Suitable securing means 39 is provided for the upper end of the bar and is shown as a screw engageable in any one of a series of recesses 41 formed in the bar. Thus, the bed can be lowered to the ground when the screw 39 is free, or supported in elevated position by the jacks 36, with the wheel 42 resting on the ground, and irrespective of the position of the bed, the guide housings can be locked in the uncoupling position. This arrangement is not required for the truck guide housings as the housings are always supported by the tractive end of the truck.

The means for transferring the load from the hydraulic jacks to the main support, such as the tractor for the semi-trailer or the frame of the tractive end of the truck consists of a member which can be moved to a positive to cooperate with the underedge of the cylinder and which member is supported by the main support.

For dead loading, a cross member 43 spans the space between the guide housings and includes a floor plate 44 which has an opening to clear the cylinder, and a pair of load carrying members 45 and 46 which are movable to cooperate with the under edge 30' of the cylinder 30, being shown as hinged at 47 and 48 and each having a semi-circular recess 49 formed to a radius equal to the radius of the plunger 34 to form an opening large enough for the plunger to slide through, but through which the cylinder will not pass, therefore, when the crosshead 27 is elevated with the bottom of the cylinder above the plate 44, and the two load carrying members are folded down, and the crosshead is then lowered, the cylinder will engage these members and support the crosshead and consequently the bed in elevated position.

With spring loading, the operation is the same except instead of transferring the load to a fixed support directly, the load is transferred through an intervening member, such as a spring, to a fixed support, and is illustrated as consisting of a spring 50 which is secured on the frame 25 or drop member 24 and which surrounds the jack; and a top spring seat 51 formed in the shape of a ring having an internal passage to clear the cylinder as indicated at 52, and a pair of washer halves 53 having each a semi-circular recess as indicated at 54 having a radius equal to the radius of the plunger for sliding clearance, and engaging the under edge of the cylinder when they are closed together. These may be simple washer halves though they are shown as being hinged at one end to the spring seat ring as indicated at 55 and having means at the other end for securing them together as indicated at 56. In the modification shown in Fig. 7, a sleeve 57 is substituted for the spring for dead loading. Thus, when the crosshead is elevated with the bottom of the cylinder above the spring seat, and the washer halves are closed together, lowering of the crosshead will transfer the load from the jack to the top of the spring. This same load carrying means can be substituted for that shown in Figs. 4, 5 and 6, as is evident.

I claim:

1. Elevating and lowering means for the front end of a vehicle bed, comprising; a vehicular support; a pair of spaced standards fixed on said front end to function as combined guides and tractive means; a crosshead spanning the tops of said standards and fixed thereto; a hydraulic jack having a cylinder having a head with said cylinder passing through a passage formed vertically centrally of said crosshead with the head of said cylinder fixed to said crosshead; a guide housing for each standard and having rollers spaced vertically on opposite sides of said standard for cooperation therewith to maintain rigidity and alignment and with said guide housings fixed to a common base in spaced relation; a plunger for said hydraulic jack and cooperating with said common base.

2. Elevating and lowering means for the forward end of a vehicle bed comprising; a vehicular support; a pair of spaced standards fixed at their lower ends to said forward end to function as combined guides and tractive means and having a crosshead spanning the upper ends and fixed thereto; and a vertical passage formed centrally of said crosshead; a cylinder having a head fixed to said crosshead with the cylinder passing through said vertical passage, and a plunger for said cylinder; a guide housing for each standard and having spaced rollers mounted therein for cooperation with opposite sides of said standard to maintain rigidity and alignment and permit raising and lowering of the standard, and including a common base member spanning said guide housings at their lower ends with said plunger cooperating therewith, whereby when fluid under pressure is admitted to the upper end of said cylinder the cylinder will raise relative to the plunger and force the crosshead upwardly to elevate the bed, and when fluid is released the cylinder will relatively lower and permit the crosshead, standards and forward end of the bed to lower.

3. Elevating and lowering means for the forward end of a vehicle bed comprising; a vehicular support; a pair of spaced standards having their lower ends fixed to said forward end; a pair of housings fixedly connected and having a common base member spanning the housings; spaced rollers in each housing and cooperating with opposite sides of the standards with the standards passing vertically through the respective housings; a crosshead spanning the upper ends of said standards and fixed thereto and having a central vertical passage; a hydraulic jack having a plunger cooperating with said common base member and having a cylinder projecting downwardly through said passage and having a head fixed to the top surface of said crosshead.

4. Elevating and lowering means for the front end of a vehicle bed comprising, a vehicular support, a pair of spaced standards fixed on said front end to function as combined guides and tractive means, a crosshead spanning the tops of said standards and fixed thereto, a hydraulic jack having a plunger, and a cylinder having a head with said cylinder passing through a passage formed vertically centrally of said crosshead with the head of said cylinder fixed to said crosshead, a guide housing for each standard and having bearings spaced vertically of said standards for sliding cooperation therewith to maintain rigidity and alignment, and with said guide housings fixed, in spaced relation, to a common base, and with said plunger cooperating with said common base, whereby said hydraulic jack is removable and replaceable at will without disturbing any other structures of the combination.

ROBERT O. BILL.

REFERENCES CITED

The following references are of record in the file of this patent:

UNITED STATES PATENTS

| Number | Name | Date |
|---|---|---|
| 2,140,264 | Kingham | Dec. 13, 1938 |
| 2,546,491 | Bill | Mar. 27, 1951 |